US006850518B1

(12) United States Patent
Khanna

(10) Patent No.: US 6,850,518 B1
(45) Date of Patent: Feb. 1, 2005

(54) DLSW RIF PASSTHRU TECHNIQUE FOR PROVIDING END-TO-END SOURCE ROUTE INFORMATION TO END STATIONS OF A DATA LINK SWITCHING NETWORK

(75) Inventor: Arun G. Khanna, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/262,264

(22) Filed: Mar. 4, 1999

(51) Int. Cl.[7] .............................................. H04L 12/56
(52) U.S. Cl. ...................................... 370/389; 370/401
(58) Field of Search ........................... 370/395.2, 395.3, 370/395.5, 401, 469, 424, 389, 392, 402, 403, 404, 405, 406, 466

(56) References Cited

U.S. PATENT DOCUMENTS

| | | | |
|---|---|---|---|
| 4,823,338 A | 4/1989 | Chan et al. ................... 370/85 |
| 4,864,559 A | 9/1989 | Perlman ...................... 370/85 |
| 5,018,133 A | 5/1991 | Tsukakoshi et al. .......... 370/16 |
| 5,027,350 A | 6/1991 | Marshall .................. 370/85.13 |
| 5,088,032 A | 2/1992 | Bosack ....................... 395/200 |
| 5,088,090 A | 2/1992 | Yacoby ................... 370/85.13 |
| 5,095,480 A | 3/1992 | Fenner ...................... 370/94.1 |
| 5,111,453 A | 5/1992 | Morrow ................... 370/85.13 |
| 5,144,622 A | 9/1992 | Takiyasu et al. ......... 370/85.13 |
| 5,280,480 A | 1/1994 | Pitt et al. ................. 370/85.13 |
| 5,309,437 A | 5/1994 | Perlman et al. .......... 370/85.13 |
| 5,323,394 A | 6/1994 | Perlman .................. 370/85.13 |
| 5,394,402 A | 2/1995 | Ross .......................... 370/94.1 |
| 5,414,704 A | 5/1995 | Spinney ....................... 370/60 |
| 5,448,565 A | 9/1995 | Chang et al. ............ 370/85.13 |
| 5,491,687 A | 2/1996 | Christensen et al. .......... 370/17 |
| 5,500,860 A | 3/1996 | Perlman et al. ........... 370/85.13 |
| 5,511,168 A | 4/1996 | Perlman et al. ........ 395/200.15 |
| 5,517,620 A | 5/1996 | Hashimoto et al. ..... 395/500.15 |
| 5,617,421 A | 4/1997 | Chin et al. ................... 370/402 |
| 5,623,532 A | 4/1997 | Houde et al. .................. 379/58 |
| 5,633,858 A | 5/1997 | Chang et al. ................ 370/255 |
| 5,684,800 A | 11/1997 | Dobbins et al. ............. 370/401 |

(List continued on next page.)

OTHER PUBLICATIONS

Draft Supplement to IEEE Std. 802.5, Annex K—DTR Concentrator Functional Description, Copyright 1995, pp. K–1–K–22.

(List continued on next page.)

Primary Examiner—Chi Pham
Assistant Examiner—Keith M. George
(74) Attorney, Agent, or Firm—Cesari and McKenna; A. Sidney Johnston

(57) ABSTRACT

A data link switching (DLSw) routing information field (RIF) passthru technique provides end-to-end source route information to source and destination endstations coupled to respective local and remote source-route bridge (SRB) subnetworks of a DLSw network. The local and remote SRB subnetworks include respective local and remote DLSw peer switches that communicate over an intermediate wide area newatork to form the DLSw network. The source route information describes a complete path between the source endstation and the local DLSw switch on the local SRB subnetwork, and the remote DLSw switch and destination endstation on the remote SRB subnetwork. The DLSw RIF passthru technique enables token ring frame exchanges between the source and destination endstations with end-to-end source route information that is transparently forwarded between the DLSw peer switches.

28 Claims, 5 Drawing Sheets

U.S. PATENT DOCUMENTS

| | | | | |
|---|---|---|---|---|
| 5,737,526 A | * | 4/1998 | Periasamy et al. | 709/241 |
| 5,740,171 A | | 4/1998 | Mazzola et al. | 370/392 |
| 5,742,604 A | | 4/1998 | Edsall et al. | 370/401 |
| 5,752,003 A | | 5/1998 | Hart | 395/500 |
| 5,764,636 A | | 6/1998 | Edsall | 370/401 |
| 5,796,732 A | | 8/1998 | Mazzola et al. | 370/362 |
| 5,848,242 A | * | 12/1998 | Behaghel et al. | 709/218 |
| 5,852,607 A | | 12/1998 | Chin | 370/401 |
| 5,872,783 A | | 2/1999 | Chin | 370/392 |
| 5,909,550 A | * | 6/1999 | Shankar et al. | 709/227 |
| 5,999,541 A | * | 12/1999 | Hinchey et al. | 370/466 |
| 6,065,062 A | * | 5/2000 | Periasamy et al. | 709/242 |
| 6,137,797 A | * | 10/2000 | Bass et al. | 370/392 |
| 6,215,772 B1 | * | 4/2001 | Verma | 370/236 |
| 6,438,133 B1 | * | 8/2002 | Ervin et al. | 370/403 |

OTHER PUBLICATIONS

Perlman, Radia, *Interconnections: Bridges and Routers*, Copyright 1992, pp. 99–125.

Tanenbaum, Andrew, *Computer Networks, Third Edition*, Copyright 1996, pp. 275–318.

World Wide Web page http://www.cisco.com/warp/public/538/7.html, *Cisco VLAN Roadmap*, Copyright 1996, pp. 1–9.

IAC Newsletter Database, *Cisco Announces Token–Ring Switching Products*, Apr. 15, 1995, pp. 4–5.

Catalyst 5000 Series Software Configuration Guide, *Chapter 13, Configuring VTP and Virtual LANs*, pp. 13–1–13–24.

World Wide Web page http://www.cisco.com/univercd/cc/td/doc/product/lan/trsrb/overview.htm, *Overview of Token Ring Switching*, Copyright 1989–1998, pp. 1–8.

Aamer Latif, et al., *The IBM 8209 LAN Bridge*, May 1992, pp. 28–37.

P802.1Q/D6, *Draft Standard for Virtual Bridged Local Area Networks*, May 1997, pp. 1–10, 70–72.

David Bryant et al., *DLSw Multicast Protocol Enhancement*, Oct. 1995, revised Jul. 1996, pp. 1–15.

Network Working Group, L. Wells et al., *Data Link Switching: Switch–to–Switch Protocol*, Apr. 1995, pp. 1–91.

World Wide Web page http://www.cisco.com/warp/public/614/2.html, *DLSw and DLSw+*, Copyright 1996, pp. 1–8.

World Wide Web page http://www.cisco.com/univercd/cc/td/doc/cisintwk/ito_doc/dlsw.htm, *Data–Link Switching (DLSw)*, Copyright 1989–1999, pp. 1–8.

World Wide Web page http://www.cisco.com/univercd/cc/t . . . are/ios113ed/113t/113t_4/trisl.htm, *Token Ring Inter–Switch Link*, Oct. 8, 1998, pp. 1–12.

World Wide Web page http://www.cisco.com/univercd/cc/t . . . duct/lan/cat3900/c3930ug/token.htm, *Understanding Token Ring Switching*, Copyright 1989–1998, pp. 1–22.

Cohen, Reuven, *A New Protocol For Route Discovery In Multiple–Ring Networks: Part I–The Basic Protocol*, 1994, pp. 488–498.

* cited by examiner

DLSW RIF PASSTHRU TECHNIQUE FOR PROVIDING END-TO-END SOURCE ROUTE INFORMATION TO END STATIONS OF A DATA LINK SWITCHING NETWORK

FIELD OF THE INVENTION

The invention relates to computer networks and, more particularly, to a method and apparatus for providing end-to-end source route information to source and destination endstations coupled to respective local and remote source-route bridge (SRB) subnetworks of a data link switching (DLSw) network.

BACKGROUND OF THE INVENTION

Data communication in a computer network involves the exchange of data between two or more entities interconnected by communication links and subnetworks. These entities are typically software programs executing on hardware computer platforms, which, depending on their roles within the network, may serve as end stations or intermediate stations. Examples of intermediate stations include routers, bridges and switches that interconnect communication links and subnetworks; an end station may be a computer located on one of the subnetworks. More generally, an end station connotes a source of or target for data that typically does not provide routing or other services to other computers on the network. A local area network (LAN) is an example of a subnetwork that provides relatively short-distance communication among the interconnected stations; in contrast, a wide area network (WAN) facilitates long-distance communication over links provided by public or private telecommunications facilities.

End stations typically communicate by exchanging discrete packets or frames of data according to predefined protocols. In this context, a protocol represents a set of rules defining how the stations interact with each other to transfer data. Such interaction is simple within a LAN, since these are typically "multicast" networks: when a source station transmits a frame over the LAN, it reaches all stations on that LAN. If the intended recipient of the frame is connected to another LAN, the frame is passed over a routing device to that other LAN. Collectively, these hardware and software components comprise a communications network and their interconnections are defined by an underlying architecture.

Most computer network architectures are organized as a series of hardware and software levels or "layers" within each station. These layers interact to format data for transfer between, e.g., a source station and a destination station communicating over the network. Specifically, predetermined services are performed on the data as it passes through each layer, and the layers communicate with each other by means of the predefined protocols. This design permits each layer to offer selected services to other layers using a standardized interface that shields the other layers from the details of actual implementation of the services.

The lower layers of these architectures are generally standardized and implemented in hardware and firmware, whereas the higher layers are usually implemented in the form of software. Examples of such communications architectures include the Systems Network Architecture (SNA) developed by International Business Machines (IBM) is Corporation and the Internet communications architecture.

The Internet architecture is represented by four layers termed, in ascending interfacing order, the network interface, internetwork, transport and application layers. The primary internetwork-layer protocol of the Internet architecture is the Internet Protocol (IP). IP is primarily a connectionless protocol that provides for internetwork routing, fragmentation and reassembly of exchanged packets—generally referred to as "datagrams" in an Internet environment—and which relies on transport protocols for end-to-end reliability. An example of such a transport protocol is the Transmission Control Protocol (TCP), which is implemented by the transport layer and provides connection-oriented services to the upper layer protocols of the Internet architecture. The term TCP/IP is commonly used to denote this architecture.

SNA is a communications framework widely used to define network functions and establish standards for enabling different models of IBM computers to exchange and process data. SNA is essentially a design philosophy that separates network communications into seven layers termed, in ascending order, the physical control layer, the data link control layer, the path control layer, the transmission control layer, the data flow control layer, the presentation services layer, and the transaction services layer. Each of these layers represents a graduated level of function moving upward from physical connections to application software.

In the SNA architecture, the data link control layer is responsible for transmission of data from one end station to another. Bridges are devices in the data link control layer that are used to connect two or more LANs, so that end stations on either LAN are allowed to access resources on the LANs. Connection-oriented services at the data link layer generally involve three distinct phases: connection establishment, data transfer and connection termination. During connection establishment, a single path or connection, e.g., an IEEE 802.2 Logical Link Control Type 2 (LLC2) connection, is established between the source and destination stations. Once the connection has been established, data is transferred sequentially over the path and, when the LLC2 connection is no longer needed, the path is terminated. Reliable communication of LLC type 2 is well-known and described by Andrew Tanenbaum in his book *Computer Networks, Second Edition*, published in 1988, all disclosures of which are incorporated herein by reference, especially at pages 253–257.

FIG. 1 is a schematic block diagram of a conventional computer network 100 having a source end station $ES_A$ coupled to token ring (TR) network TR1 and a destination end station $ES_B$ coupled to TR4. The TR networks are of a type that support source-route bridging (SRB) operations with respect to the contents of a routing information field (RIF) of a frame. An SRB bridge B1 further interconnects TR1 and TR2, while SRB B3 interconnects TR4 and TR3; SRB bridge B2 then couples TR2 to TR3. The SRB network 100 essentially functions as a LAN because there is no WAN cloud disposed within the network.

End stations $ES_A$ and $ES_B$ communicate by exchanging TR frames over LLC2 connections or sessions through the SRB network. Each TR frame 110 includes a RIF 112 that contains source route information in the form of ring number/bridge number pair "hops" within a path between the source and destination end stations. For example, the RIF 112 of TR frame 110 transmitted by $ES_A$ to $ES_B$ contains <0011.0022.0033.0040>. A control field 114 appended to the RIF 112 of the frame 110 specifies the type of TR frame; one type of frame is a spanning tree explorer (STE) frame having control field contents of <CA70>. An LLC2 session is established between the end stations using a special TR frame, such as the STE frame.

Specifically, the STE frame is used by a source (e.g., $ES_A$) to "discover" the path to a destination (e.g., $ES_B$); thereafter, a set asynchronous balanced mode extended (SABME) frame is sent from $ES_A$ to $ES_B$ to establish a logical connection between the endstations, and $ES_B$ responds to the SABME frame with an unnumbered acknowledgment (UA) frame. Once the UA frame is received by $ES_A$, a connection is established between the source and destination, and these end stations communicate by exchanging TR information (INFO) and acknowledgement frames until the logical link session is completed.

For example, $ES_A$ transmits an INFO frame over TR1 and through the various bridges and rings to $ES_B$. Upon successfully receiving the INFO frame, $ES_B$ responds by transmitting an LLC2 Receive/Ready (RR) acknowledgment frame over the SRB network to $ES_A$. This INFO/RR exchange continues until $ES_A$ has successfully transmitted all of its data and $ES_B$ has successfully received all of that data. Session completion is then initiated by a disconnected mode (DM) frame being transmitted from $ES_A$ to $ES_B$; the disconnection is thereafter acknowledged by $ES_B$ responding with a UA frame. The LLC2 frames (packets) are described by Radia Perlman in her book *Interconnections, Bridges and Routers*, published by Addison Wesley Publishing Company, in 1992, all disclosures of which are incorporated herein by reference, particularly at pages 33–34.

As noted above, each TR INFO frame sent from a source to a destination is acknowledged by an RR frame; if the source end station does not receive the acknowledgment frame within a prescribed period of time, a "time-out" occurs and the source sends a DM frame to prematurely terminate the session. Since the network 100 is a LAN, it facilitates fast transfer of information between its connected stations and, as a result, a time-out condition should rarely occur. If a WAN, such as a Transmission Control Protocol/ Internet Protocol (TCP/IP) cloud, is disposed within a LAN-based network, it is likely that a time-out will arise because of the latencies introduced by the TCP/IP cloud. That is, a frame traversing the WAN cloud incurs substantial delay as opposed to the LAN because the WAN is generally not as fast as the LAN.

Data link switching (DLSw) is a mechanism for forwarding SNA and Network Basic Input Output Services (NetBIOS) protocol frames over a TCP/IP backbone WAN, such as the Internet. In traditional bridging, the data link connection is end-to-end, i.e., effectively continuous between communicating end stations. A stream of data frames originating from a source end station on a source LAN traverses one or more bridges specified in the path over the LLC2 connection to a destination station on a destination LAN. In a network implementing DLSw, by contrast, the LLC2 connection terminates at a local DLSw device, e.g., a switch. An example of a DLSw network arrangement may comprise one or more local DLSw devices connected to a local LAN having a source end station and a remote DLSw device connected to a remote LAN having a destination end station. The LANs that are accessed through the DLSw devices may appear as SRB subnetworks attached to adjacent rings; each of these adjacent rings manifest as a virtual ring within each DLSw device that effectively terminates the SRB subnetwork.

FIG. 2 is a schematic block diagram of such a DLSw network 200 having a TCP/IP cloud 210 disposed between local and remote SRB subnetworks 202, 204. When communicating with $ES_B$ as described above, $ES_A$ sends an INFO frame to which $ES_B$ responds with an RR frame. Because of the latencies introduced by the WAN cloud, however, a time-out condition occurs during this exchange.

To solve this problem, the DLSw network includes local and remote DLSw devices that border the WAN cloud; these DLSw devices function as endpoints between TCP sessions over the TCP/IP WAN cloud when transporting TR frames associated with LLC2 sessions over that intermediate cloud. DLSw switching obviates the time-out problem introduced by the TCP/IP network by, e.g., having the local DLSw switch return a RR acknowledgment frame to the source end station upon receiving an INFO frame. Notably, the RR frame is returned prior to transmitting the native TR INFO frame over the TCP/IP network.

Broadly stated, each DLSw device establishes a "peer" relationship to the other DLSw device in accordance with a conventional capabilities exchange message sequence, and the logical and physical connections between these devices connect the subnetworks into a larger DLSw network. To establish a DLSw peer connection, the local DLSw device first opens logical TCP (read/write) "pipe" connections to the remote DLSw device using a conventional socket technique to create a socket into the transport layer of the protocol stack. Once the TCP pipes are established, a switch-to-switch (SSP) protocol is used to transport the capabilities exchange messages between the two DLSw devices.

The capability exchange messages contain various parameters, such as the number of pipes used for communicating between the DLSw devices and the largest frame size supported by the devices. Each DLSw device responds to each capability exchange message issued by its peer device with a capability exchange response message. Upon completion of the exchange, each device reconfigures itself to "act upon" the agreed capabilities and the peer connection is established. Establishment of a peer connection occurs automatically upon "boot-up" of each DLSw device; that is, as soon as a DLSw device activates, it connects with its DLSw peer. The DLSw forwarding mechanism is well-known and described in detail in Wells et al., *Request for Comment (RFC)* 1795 (1995).

Upon receiving a TR frame from a source on the local SRB subnetwork, the local DLSw device employs the SSP protocol to communicate with its DLSw peer device by forwarding the native TR frame over the TCP/IP network to a remote SRB subnetwork. That is, the TR frame received at the local DLSw switch from the source is encapsulated within a SSP protocol frame and forwarded over the TCP/IP WAN to the remote DLSw switch. Notably, the source route information contained in the RIF of each TR frame also terminates inside the virtual ring of the DLSw switch. That is, the encapsulated SSP frame does not contain any source route information from the source to the local DLSw switch.

The local DLSw device then multiplexes the LLC2 data stream over a conventional TCP transport connection to a remote DLSw device. LLC2 acknowledgement frames used to acknowledge ordered receipt of the LLC2 data frames are "stripped-out" of the data stream and acted upon by the local DLSw device; in this way, the actual data frames are permitted to traverse the IP WAN to their destination while the "overhead" acknowledgement frames required by LLC2 connections for reliable data delivery are kept off the WAN. The LLC2 connections from the source LAN to the local transmitting DLSw device, and from the remote receiving DLSw device to the destination LAN, are entirely independent from one another. Data link switching may be further implemented on multi-protocol routers capable of handling DLSw devices as well as conventional (e.g., SRB) frames.

The remote switch decapsulates the SSP frame to recover the native TR frame is and, if it has "cached" (i.e., stored)

routing information from the remote switch to a destination on the remote SRB subnetwork, it loads the RIF of the frame with this information. Thus, the routing information loaded into the RIF starts from the virtual ring of the remote DLSw device and does not contain the source route information from the source endstation on the local SRB subnetwork. As a result, a TR frame cannot be transparently forwarded from a local SRB subnetwork to a remote SRB subnetwork over a DLSw network merely based upon the RIF of the TR frame.

FIG. 3 is a logical flow diagram illustrating establishment of a DLSw session over the DLSw network 200. After the DLSw peer connection is established, $ES_A$ transmits an explorer frame, known as a test poll (TEST P) frame, over the connection to discover the destination $ES_B$. The TEST P frame includes, inter alia, a RIF with a control field having the contents of <C270>which denotes a broadcast explorer frame, wherein the direction bit is zero indicating a forward interpretation of the RIF. The TEST P frame is sent by $ES_A$ to discover the medium access control (MAC) address of $ES_B$. The TEST P frame is issued by $ES_A$ to the local DLSw device, which then transposes that frame into an SSP frame format for transmission over the WAN cloud.

Specifically, the local DLSw device translates the TEST P frame into a can-you-reach (CUR_ex) frame for transmission over the TCP/IP cloud. As noted, the contents of the RIF terminate on a virtual ring within the local DLSw device; as shown in FIG. 2, the virtual ring is assigned ring number 4095 (FFF hex) and the DLSw device is assigned bridge number 1. Therefore, when the local DLSw device receives the TEST P frame, the frame has traversed two token rings and a bridge; accordingly, the RIF contents comprise 6-bytes of routing information <C670.0011.FFF0>, wherein the control header contents are <C670>. The RIF information contained in the frame is stored locally in the local DLSw device prior to that device transmitting the CUR_ex frame over the TCP/IP cloud.

When constructing the CUR_ex frame, the local DLSw device inserts into the header of the SSP frame information such as the destination MAC (DMAC), source MAC (SMAC), destination service access point (DSAP) and source SAP (SSAP) that it extracted from the TEST P frame. The CUR_ex frame is then transmitted over the TCP/IP cloud and received at the remote DLSw device. Note that the local SRB network terminates at the local DLSw device and another remote SRB network is formed on the other side of the WAN at the remote DLSw device, which is assigned a bridge number of 2 and a virtual ring number 4094 (FFE hex).

Upon receiving the CUR_ex frame, the remote DLSw device translates that frame into a TEST P frame using the DMAC, SMAC, DSAP, SSAP and other pertinent information. The remote DLSw device also inserts into the RIF the following routing information: <FFE2.0020>. The BN0 associated with RN002 of the RIF denotes that the destination ($ES_B$) is coupled to the ring RN002. In response to receiving the TEST P frame, $ES_B$ returns a test final (TEST F) response frame that is received by the remote DLSw device; the remote DLSw device translates the TEST F frame into an I-can-reach explorer (ICR_ex) frame that is transmited over the TCP/IP cloud to the local DLSw device. The ICR_ex frame is similar in format to the CUR_ex frame; that is, both frames incorporate the SSP protocol along with the necessary information from the TR frame. Upon receiving the ICR_ex frame, the local DLSw device generates a TEST F frame for transmission to $ES_A$. The TEST F frame incorporates information locally stored at the local DLSw device as a result of the initial TEST P frame issued by $ES_A$. Notably, the local DLSw device correlates the ICR_ex frame with the locally-stored information using the DMAC, SMAC, SSAP and DSAP information.

In response to receiving the TEST F frame, $ES_A$ examines the RIF and formulates a simple view of a path to $ES_B$ comprising a 2-ring $SR_B$ network. In other words, $ES_A$ examines the RIF of the TEST F frame and determines that the path to $ES_b$ comprises RN1, BN1 and RN4095. $ES_A$ then initiates a conventional XID message exchange (defined by the SNA protocol) with $ES_8$. Broadly stated, $ES_A$ sends an XID null poll (NULL P) frame to $ES_B$ that is received by the local DLSw device and interpreted as a request to establish a DLSw circuit over the TCP/IP network. In response to the NULL P frame, the local DLSw device issues a can-you-reach circuit start (CUR_cs) frame to the remote DLSw device; the CUR_cs frame is an initiate circuit setup message.

Since the remote DLSw device has previously reached $ES_B$ (and has cached the previous TEST P/F information), it returns an I-can-reach circuit start (ICR_cs) frame to the local DLSw device in response to the CUR_cs frame. Upon receiving the ICR_cs message, the local DLSw device issues an acknowledgment (REACH_ACK) that is received by the remote DLSw device and which places the DLSw switches into a circuit establishment state. The XID NULL P that was previously sent from $ES_A$ to the local DLSw device has not yet been transported over the IP and has, in fact, been cached at the local DLSw device. Upon establishing the SSP circuit over the IP WAN, the DLSw devices generate a correlator that correlates the SNA LLC circuit to the established SSP circuit. The correlator may be substituted for the DMAC, SMAC, DSAP, SSAP format that had been used to correlate frames from the SRB network over the TCP/IP cloud.

Thereafter, the local DLSw device sends the cached XID NULL P frame over the TCP/IP circuit to the remote DLSw device. This frame assumes the form of an XIDFRAME having an SSP format but with the data portion of the XID NULL P frame. That is, the local DLSw device "strips-off" the header of the XID NULL P frame and loads the remaining data portion into the XIDFRAME for transmission over the TCP/IP network to the remote DLSw device. At the remote DLSw device, the XIDFRAME is converted back to an XID NULL P message with a RIF that includes routing information previously cached at the remote device and that identifies the route to $ES_B$. $ES_B$ responds with an XID frame that is translated by the remote DLSw device into an XIDFRAME for transmission over the TCP/IP network. Upon receiving this latter frame, the local DLSw device translates it into an XID frame and loads the RIF with the locally cached routing information to $ES_A$; the local DLSw device then transmits the XID frame to $ES_A$. Thereafter, after, an XID frame exchange occurs between the endstations to establish an end-to-end circuit connection with negotiated and agreed-upon parameters defining that connection.

Upon reaching a mutually agreeable set of parameters for a connection, $ES_A$ transmits a SABME frame to initiate establishment of an actual session for transferring data between the endstations. The local DLSw device receives the SABME frame and transitions to a connect pending state wherein it translates the SABME message into a CONTACT frame for transmission over the TCP/IP network cloud. The remote DLSw device receives the CONTACT frame and translates it into a SABME frame for transmission to $ES_B$. This is essentially the first attempt to establish an actual connection across the TCP/IP cloud from either end of the $SR_B$ network. $ES_B$ responds to the SABME frame with a UA frame that, upon being received by the remote DLSw device, is translated to a CONTACTED frame for transmission over the TCIP/IP cloud; the remote DLSw device then transitions to a connected state. Similarly, upon receiving the CONTACTED frame, the local DLSw device enters a connected state and translates the received frame into a UA frame for transmission to $ES_A$. When $ES_A$ receives the UA, a DLSw session is established and $ES_A$ begins transmitting information frames (IFRAMEs) that are translated into INFO_FRAMEs at the DLSw devices for transmission over the IP cloud. The IFRAMEs contain the actual data transferred between the end stations.

Although an end-to-end session is established between end stations, the end stations do not have a complete view of the route between them. That is, the source route information contained within the RIF of a TR frame issued by a source end station over the local SRB network is cached at the local DLSw device and is not present in the RIF of the TR frame transmitted by the remote DLSw device over the remote SRB network. Correlators are used to associate the local and remote SRB routes over the TCP/IP connections between the DLSw devices.

Some applications require transparent forwarding of a TR frame from a source to a destination via the DLSw devices based on the end-to-end RIF. For example, a remote network control protocol (NCP) load application loads an image of an NCP program executing on a source front end processor (FEP) to a destination FEP. Remote NCP load is a protocol that is tailored towards loading the NCP image in a remote station and cannot function in a conventional DLSw network environment because the remote NCP load protocol does not accommodate the exchanges required to establish a connection in a DLSw network; i.e., it is not a connection-oriented protocol. Therefore, current DLSw networks do not support applications such as remote NCP load, LAN manager or redundant explorer filtering. The present invention is directed to a technique that allows applications such as remote NCP load to be executed over a DLSw network.

SUMMARY OF THE INVENTION

The invention relates to a data link switching (DLSw) routing information field (RIF) passthru technique that provides end-to-end source route information to source and destination endstations coupled to respective local and remote source-route bridge (SRB) subnetworks of a DLSw network. The local and remote SRB subnetworks include respective local and remote DLSw peer switches that communicate over an intermediate wide area nework (WAN) to form the DLSw network. The source route information describes a complete path between the source endstation and the local DLSw switch on the local SRB subnetwork, and the remote DLSw switch and destination endstation on the remote SRB subnetwork. As described herein, the novel DLSw RIF passthru technique enables token ring (TR) frame exchanges between the source and destination endstations with end-to-end source route information that is transparently forwarded between the DLSw peer switches.

Broadly stated, source route information representative of the local SRB subnetwork path is accumulated within a RIF of a first token ring (TR) explorer frame issued by the source endstation and received by the local DLSw switch. The local switch extracts the source route information from the first TR explorer frame and loads that information into a novel control vector that is appended to a switch-to-switch protocol (SSP) header message. In accordance with the invention, the novel control vector is a SSP_RIF control vector having a format that includes a length field, an identification (ID) field and a source route information field. The length field specifies the length of the control vector, whereas the contents of the ID field specify an SSP_RIF type of control vector and the source route information field contains the RIF contents of the first TR explorer frame.

The local switch then transports the SSP control vector message over a Transmission Control Protocol/Internet Protocol (TCP/IP) WAN cloud to the remote peer switch, which extracts the source route information from the SSP_RIF control vector. The remote DLSw switch then generates a second TR explorer frame, appends "next hop" information onto the source route information contained within a RIF of the frame and transmits the TR explorer frame over the remote SRB subnetwork to the destination endstation. Upon receiving the explorer frame, the destination endstation has complete source route information representative of an end-to-end session between itself and the source endstation.

In accordance with an aspect of the inventive technique, three new SSP capability exchange vectors are defined and exchanged among the DLSw peer devices prior to establishing a DLSw RIF passthru session. The first capability exchange vector is a DLSw RIF passthru vector that indicates whether each DLSw peer device supports DLSw RIF passthru exchanges. If one of the DLSw peer switches is not configured for RIF passthru functionality, the remaining two vectors (together with the SSP_RIF control vector) are ignored by the non-compliant switch and a RIF passthru session is not available between switches. By allowing switches not configured with RIF passthru functionality to simply ignore the novel SSP capability exchange vectors, the inventive technique provides backward compatibility with existing DLSw networks.

A second capability exchange vector is a DLSw virtual ring vector that indicates a virtual ring used by the DLSw device. The local and remote DLSw switches preferably negotiate a common value of their virtual rings since, in connection with the inventive RIF passthru technique, the DLSw network effectively becomes a single SRB network. The third capability exchange vector is a DLSw local rings vector that specifies a list of local rings attached to each DLSw device. This information is preferably stored in a local database established by the DLSw switch and used by the switch when forwarding TR frames over the SRB network.

According to another aspect of the present invention, a novel RIF passthru frame is used to transport TR frames over the TCP/IP WAN cloud after complete source route information is available to both of the endstations on the local and remote SRB subnetworks. The novel frame is a DLX INFO frame that contains information required for an end-to-end RIF passthru session. The DLX INFO frame includes a header comprising a version number field, a message type field, a message length field, a next hop ring number field and a next hop bridge number field. An incoming TR frame is appended to the DLX INFO frame header by a DLSw device and forwarded over the TCP/IP WAN cloud to its DLSw peer device.

Advantageously, the invention provides end-to-end transparent session establishment through a DLSw network as if the network is a single SRB network. To that end, the novel DLSw passthru technique allows DLSw switches to support different applications having different types of frames by transparently forwarding these frame over a DLSw network to a remote user based upon complete source route information. Thus an application such as LAN manager can show a complete network topology since its path finding frames may traverse the DLSw network end-to-end. If loops are present in the network, redundant explorers can be dropped based upon RIF scanning since the RIF will reflect the entire path taken by the frame.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
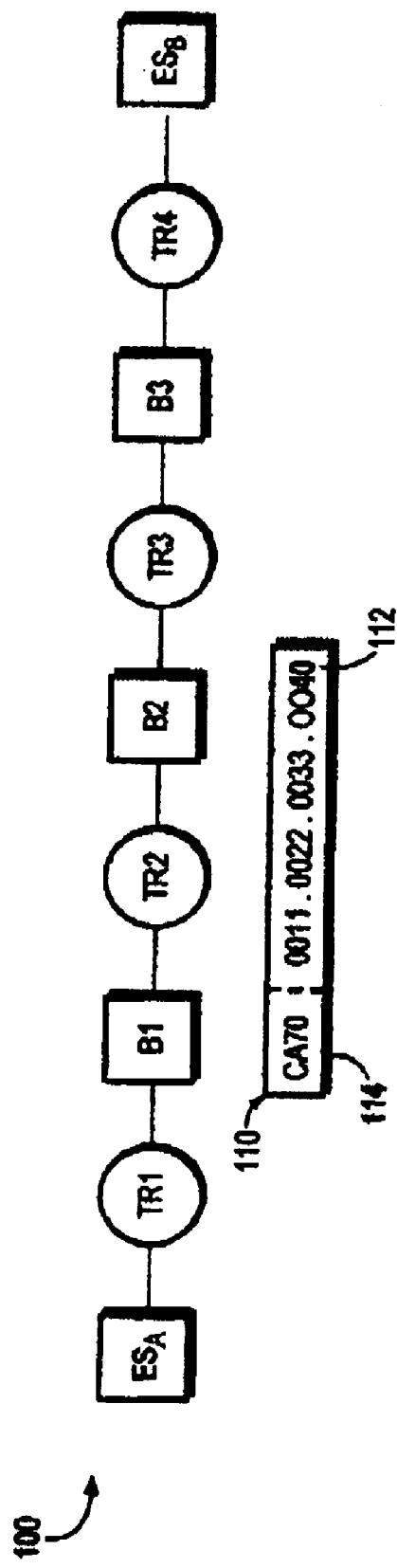
FIG. 1 is a schematic block diagram of a conventional source-route bridging (SRB) computer network.
Figure 2:
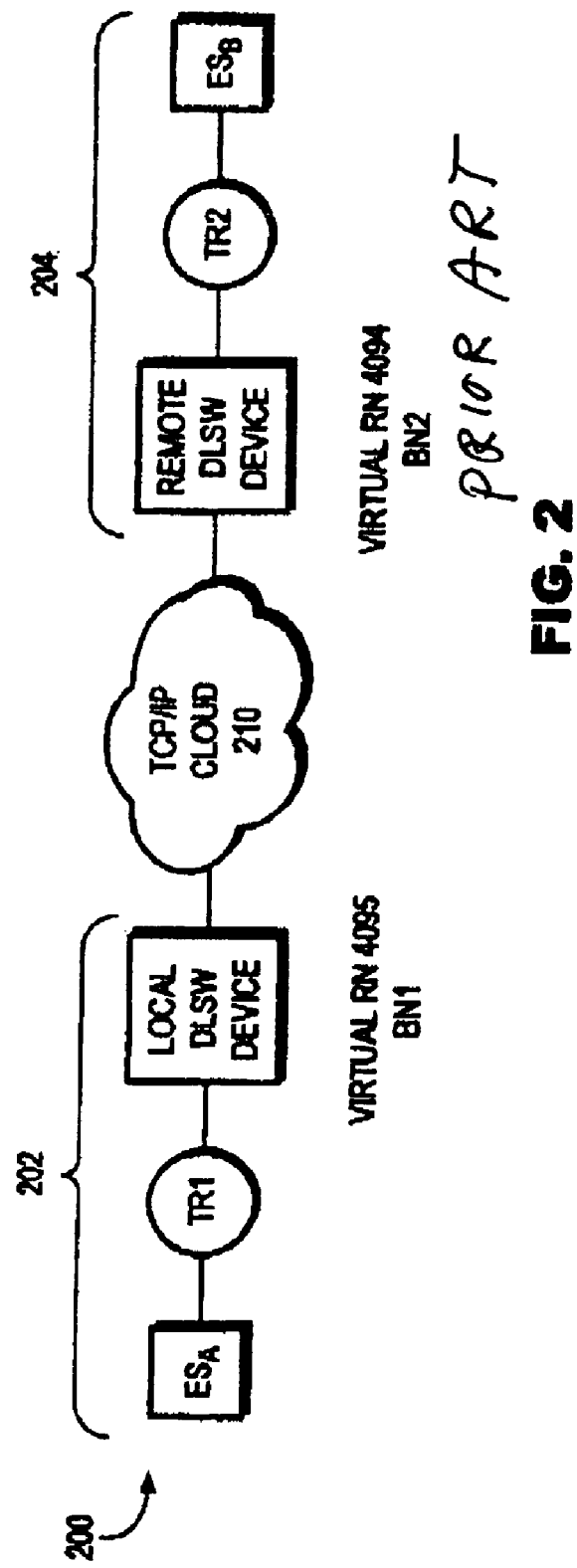
FIG. 2 is a schematic block diagram of a conventional data link switching (DLSw) network having a transmission control protocol/Internet protocol (TCP/IP) cloud disposed between local and remote SRB subnetworks.
Figure 3:
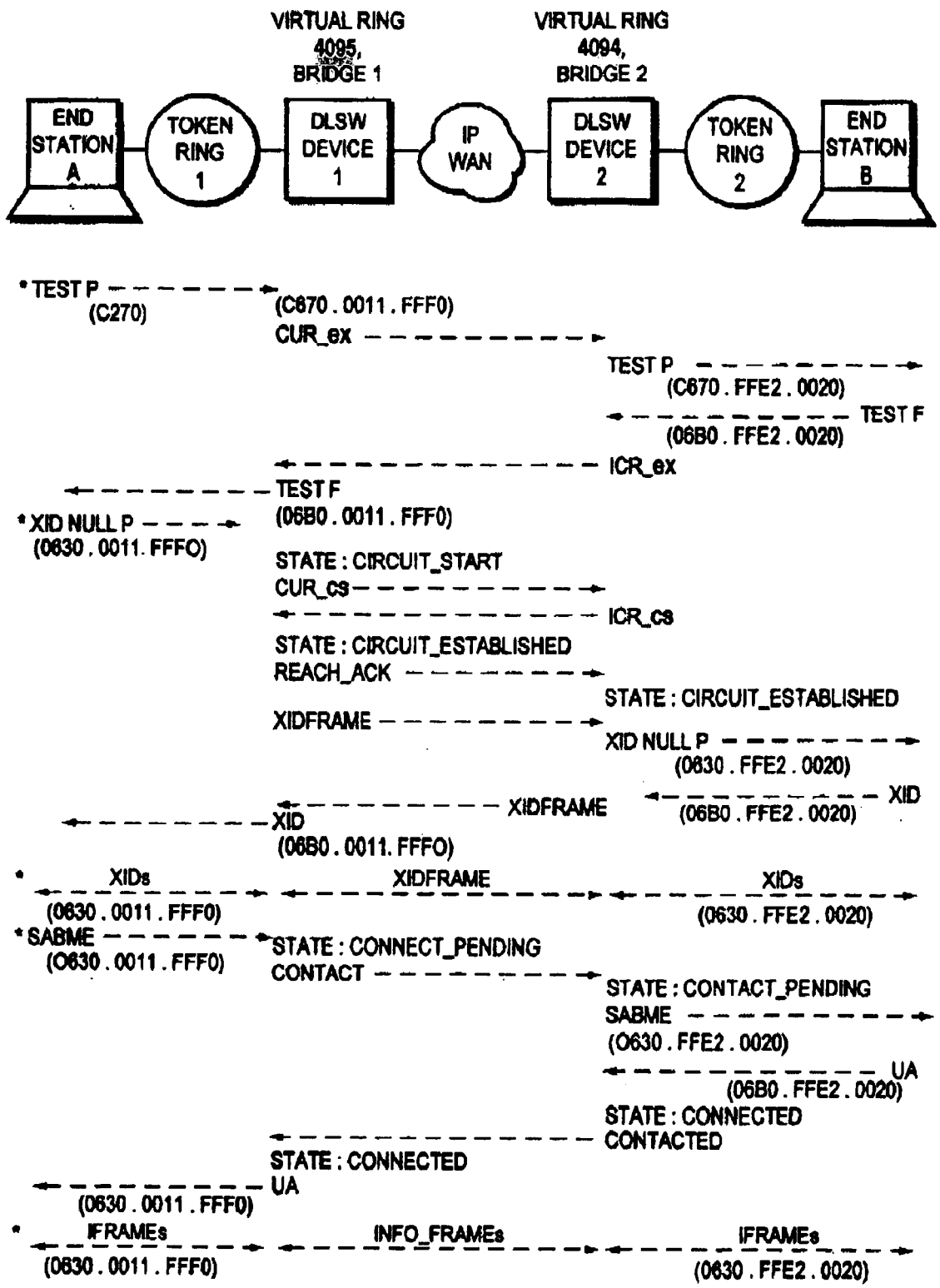
FIG. 3 is a logical flow diagram illustrating establishment of a DLSw session over the DLSw network of FIG. 2.
Figure 4:
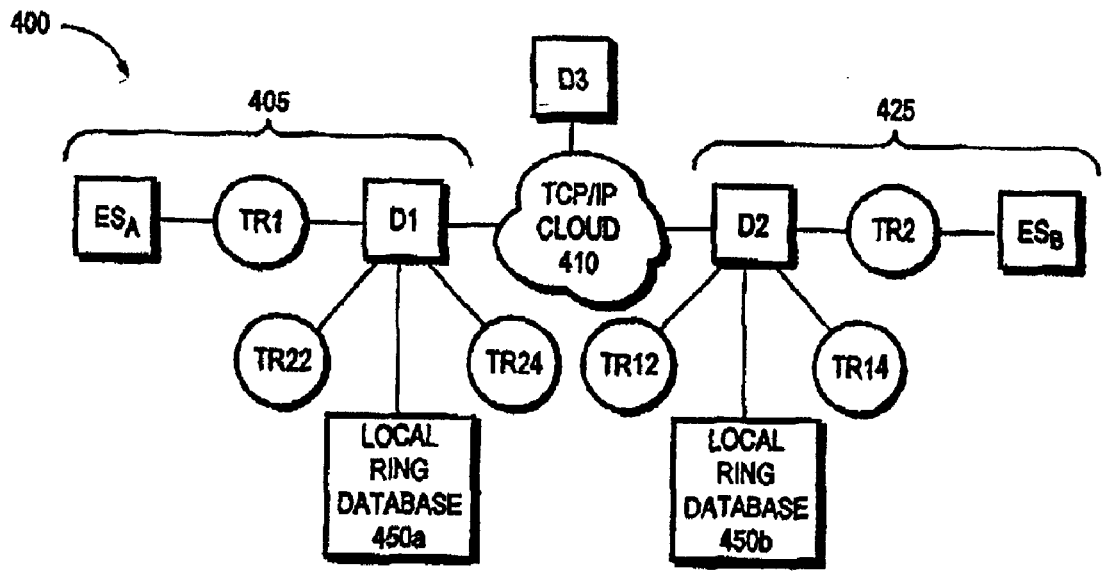
FIG. 4 is a schematic block diagram of a DLSw computer network configured to exchange data between end stations of a plurality of subnetworks through DLSw peer devices in accordance with a technique of the present invention.

FIG. 4 is a schematic block diagram of a data link switching (DLSw) computer network 400 that is configured to exchange data between end stations in accordance with the present invention. The network 400 comprises a plurality of source-route bridge (SRB) subnetworks 405, 425 interconnected by a wide area network (WAN) cloud 410 to form a single, distributed network. Each SRB subnetwork 405, 425 preferably includes end stations connected by physical media, such as cables and network interface cards, in order to facilitate communication. Specifically, local SRB subnetwork 405 includes a source end station $ES_A$ coupled to a token ring (TR) local area network (LAN)TR1 and remote SRB subnetwork 425 includes a destination end station $ES_B$ coupled to TR2. Intermediate stations, such as DLSw devices D1 and D2, are used to interconnect the subnetworks and facilitate communication among the local and remote end stations over the WAN 410, which is preferably an intermediate transmission control protocol/Internet protocol (TCP/IP) cloud.

Each station typically comprises a plurality of interconnected elements, such as a processor, a memory and a network adapter. The memory may comprise storage locations addressable by the processor and adapter for storing software programs and data structures associated with the inventive mechanism and technique. The processor may comprise processing elements or logic for executing the software programs and manipulating the data structures. An operating system, portions of which are typically resident in memory and executed by the processor, functionally organizes the station by, inter alia, invoking network operations in support of software processes executing on the station. It will be apparent to those skilled in the art that other processor and memory means, including various computer readable media, may be used for storing and executing program instructions pertaining to the technique described herein.

Communication among the end stations is effected by exchanging discrete packets or frames of data according to predefined protocols and services; an example of a connection-oriented service that may be used to ensure reliable communication between a source end station and a destination end station is an IEEE 802.2 Logical Link Control Type 2 (LLC2) connection service. The DLSw devices D1 and D2 facilitate such communication by establishing peer relationships among themselves through the exchange of conventional Capabilities Exchange messages, as defined in RFC 1795. These peer devices further cooperate to establish a conventional reliable transport connection, such as a TCP connection, that enables multiplexing of LLC2 TR frames over the TCP transport between the devices.

As a result, the DLSw devices D1, D2 function as "peers" having logical and physical connections among them for interconnecting the subnetworks 405, 425 through the WAN 410 to form the DLSw network 400. In particular, DLSw device D1 is configured as a local DLSw device, while DLSw device D2 is configured as remote DLSw device. Each DLSw device includes software processes that (i) interact with the SRB subnetwork at "datalink" (network interface) layer of a protocol stack, thereby functioning as an SRB interface to the SRB subnetwork and that (ii) interface with the TCP/IP cloud at an application layer by opening, e.g., a conventional "socket" to establish a TCP session connection when transporting the TR frames over the cloud 410.

In accordance with the present invention, a DLSw routing information field (RIF) passthru technique provides end-to-end source route information to the source and destination end stations coupled to the local and remote SRB subnetworks of the DLSw network. Each DLSw device must be configured to support the inventive RIF passthru technique in order to establish a RIF passthru session. In the illustrative embodiment, DLSw device D1 and its peer D2 are configured to support the RIF passthru protocol and, thus, may participate in a RIF passthru session between the local and remote SRB subnetworks over the TCP/IP cloud. If one of those devices is not configured as such, then a RIF passthru session can not be employed and communication between DLSw switches D1 and D2 resort to the typical DLSw switching model defined by RFC 1795.

Figure 5:
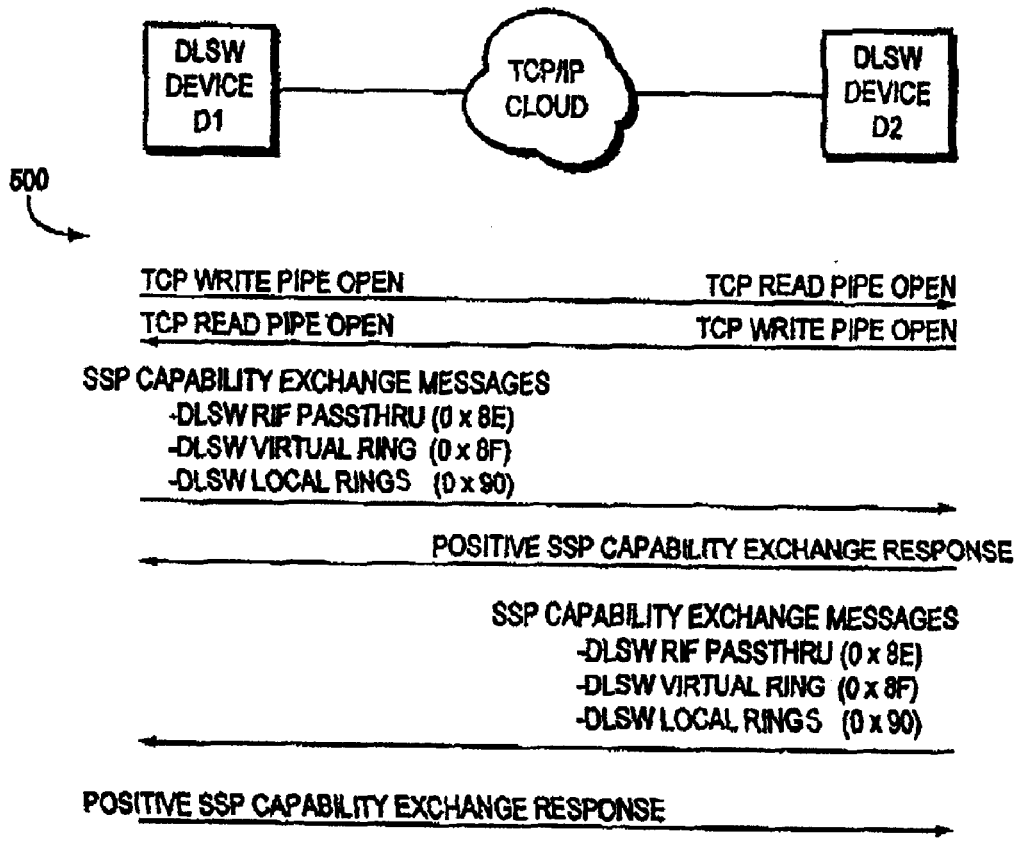
FIG. 5 is a logical flow diagram showing an exchange of novel switch-to-switch (SSP) capability messages between the DLSw peer devices in accordance with the present invention.

In order to determine whether the DLSw devices are configured to support DLSw RIF passthru functionality, the devices exchange switch-to-switch protocol (SSP) capabilities messages. FIG. 5 is a logical flow diagram 500 showing the exchange of SSP capability messages after opening conventional TCP (write/read) "pipe" connections between the DLSw peer switches D1 and D2. The present invention relates, in part, to three novel SSP capability messages that are exchanged among the DLSw peer switches to determine whether the peer devices support DLSw RIF passthru functionality. The format of these novel SSP capability exchange messages are defined by the Capabilities Exchange Formats/Protocol of RFC 1795.

A first of these novel exchange message data structures is a DLSw RIF passthru exchange vector that indicates whether the DLSw device peer supports DLSw RIF passthru functionality. Only if both the local and remote DLSw switches support RIF passthru will an end-to-end, RIF passthru session be established. This capability exchange vector can be sent both at start-up and run time. In the illustrative embodiment, the DLSw RIF passthru exchange vector has a control vector identifier (ID) value of 0x8E (hex).

The second capability exchange vector is a DLSw virtual ring vector that indicates the virtual ring used by the DLSw device. For DLSw RIF passthru operations, it is desirable that both the local and remote DLSw switches negotiate the same value of their virtual rings since the inventive technique essentially transforms the DLSw network into a single SRB network. In other words, the DLSw peer devices should negotiate on the same value of the virtual ring to ensure that the virtual ring within each device becomes a single "logical" virtual ring for purposes of RIF passthru. In the illustrative embodiment, the DLSw virtual ring exchange vector has a control vector ID value of 0x8F (hex).

The third capability exchange vector is a DLSw local rings vector that indicates a list of local rings attached to each DLSw device. This information is used by each DLSw device when forwarding the TR frames to specific remote DLSw devices. Specifically, the DLSw local rings vector informs a DLSw device as to those rings that its DLSw peer device can reach (i.e., which rings are locally-attached to the DLSw device). For example, DLSw device D1 sends a DLSw local rings exchange vector to its DLSw peer device D2 wherein the list of D1 local rings includes TR1, TR22 and TR24. Similarly, DLSw device D2 sends a DLSw local rings exchange vector to its DLSw peer device D1 containing a list of D2 local rings that includes TR2, TR12 and TR14. In the illustrative embodiment, the DLSw local rings exchange vector has a control vector ID value of 0x90 (hex).

A local database, e.g., a table data structure, is preferably coupled to and established by each DLSw peer device to store information about the locally-attached rings. The database 450a,b is accessed when a TR frame is received by the DLSw device over the SRB subnetwork. As described further herein, the database is searched for a next hop ring number (RN) and bridge number (BN) beyond the DLSw virtual ring within each DLSw device. When an entry is found, the TR frame is forwarded to the remote DLSw device that is locally-attached to this next hop RN. A novel RIF passthru (DLX) header is then prepended to the TR frame and forwarded to that remote DLSw device.

A remote DLSw peer device must respond positively to each of the three novel capability exchange messages issued by the local DLSw device in order to implement the novel RIF passthru protocol. In the event the remote DLSw device does not respond positively to each of these capability exchange messages, communication between the DLSw peer devices resorts to the conventional RFC 1795 DLSw switching model. For example if a DLSw device responds to its DLSw peer device's request for a virtual ring number with a different virtual ring number, then the DLSw RIF passthru protocol will not be implemented between those devices and the devices communicate using the conventional SSP protocol as defined in RFC 1795.

Figure 6:
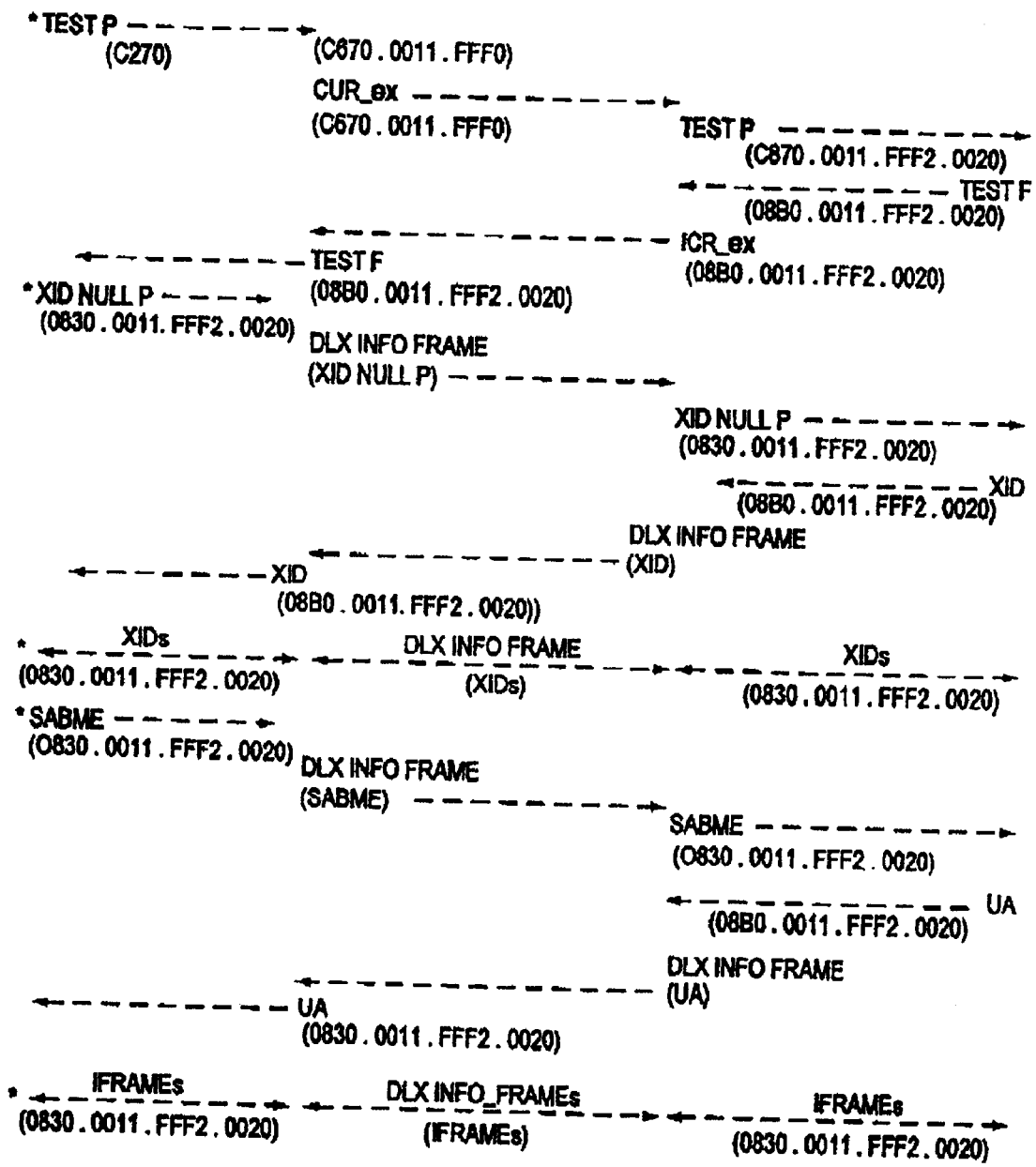
FIG. 6 is a logical flow diagram showing establishment of a DLSw RIF passthru session in accordance with the present invention.

Once it has been determined that the DLSw devices support RIF passthru, a DLSw RIF passthru session is established as shown in the logical flow diagram 600 of FIG. 6. A test poll (TEST P) explorer frame is transmitted by $ES_A$ over the SRB subnetwork 405 to DLSw device D1. $ES_A$ issues the TEST P frame to discover a path to a particular destination medium access control (MAC) address (e.g., $ES_B$) for SNA traffic; similarly, for NetBIOS traffic, $ES_A$ sends a NetBIOS Name Query explorer frame to find a path to the NetBIOS name of a particular destination (e.g., $ES_B$). The TEST P frame initially has a RIF of C270; when the frame is received by a LAN interface of D1, the RIF contents are changed to C670. Since the source route information stored in the RIF of the frame must terminate on the DLSw virtual ring, the incoming ring number (001), the bridge number (1) and the virtual ring number (FFF) is added to the RIF. Accordingly, the RIF contents of the TEST P frame are: <C670.0011.FFF0>.

Figure 7:
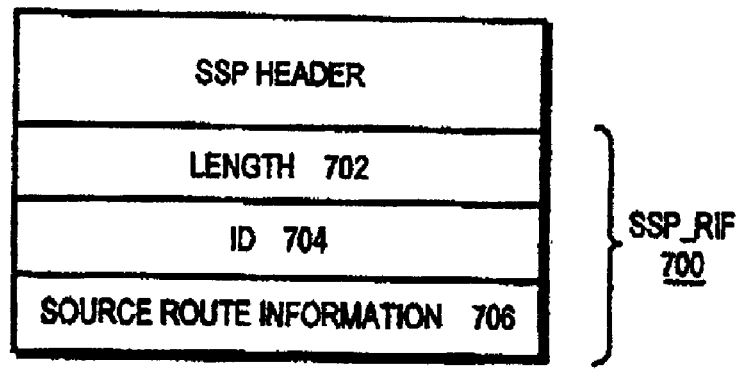
FIG. 7 is a schematic diagram of the format of a novel SSP_RIF control vector in accordance with the present invention.

DLSw device D1 then converts the TEST P frame into a can_you_reach explorer (CUR_ex) frame for transmission over the TCP/IP WAN cloud to DLSw device D2. The CUR_ex frame is sent to all DLSw devices that have a TCP/IP connection with DLSw device D1. The CUR_ex frame is an SSP message having an SSP header format defined by the RFC 1795 DLSw standard. In accordance with the invention, a novel control vector is appended to the SSP message. FIG. 7 is a schematic diagram of the format of the novel control vector structure, SSP_RIF 700, including a length field 702, an identifier (ID) field 704 and a source route information field 706. The length field 702 specifies the length of the control vector which, in the illustrative embodiment, is 20 bytes. The contents of the ID field 704 specify an SSP_RIF type of control vector and the contents of the source route information field 706 include the contents of the TEST P RIF in addition to the control field contents (e.g., C670.0011.FFF0).

Referring also to FIG. 4, each DLSw device that receives the CUR_ex frame and is configured for RIF passthru examines the frame for the control vector SSP_RIF appended to the SSP header of the message. As described previously, DLSw D1 and DLSw D2 engaged in a RIF passthru capability exchange sequence to ensure that both of the DLSw peers are RIF passthru compliant. Since DLSw device D2 is configured for RIF passthru functionality, it retrieves the source route information from the SSP_RIF control vector 700 of the SSP message. DLSw device D3, on the other hand, is connected to the IP cloud and functions as a DLSw peer to DLSw D1; yet DLSw D3 is not RIF passthru compliant. According to the invention, DLSw D3 receives the CUR_ex frame but ignores the SSP_RIF control vector 700 appended to the CUR_ex frame, thereby providing backward compatibility with existing DLSw networks.

Referring again to FIG. 6, DLSw D2 then generates a TEST P frame from the CUR_ex frame for transmission over all of its local TR LANs. DLSw device D2 loads the source route information received in the SSP message into the RIF of the TEST P frame and further extends the RIF for the next hop RN to which the TEST P frame is being forwarded; accordingly, the RIF of the TEST P frame contains: <C870.0011.FFF2.0020>. These contents of the RIF represent a path through a single, logical SRB network of TR1, BN1, virtual TR4095, BN2 and TR2 when the frame is eventually received by $ES_B$. In other words, $ES_B$ receives a TEST P frame with complete end-to-end source route information in the RIF. In response, $ES_B$ transmits a test response final (TEST F) frame with the complete source route information, along with an inverted direction bit and updated largest frame bits of the RIF (e.g., 08B0.0011.FFF2.0020).

DLSw device D2 receives the TEST F frame and extracts the source route information from that frame. DLSw D2 then translates the TEST F frame into an I_can_reach explorer (ICR_ex) frame, as defined by the RFC 1795, for transfer over the TCP/IP cloud to DLSw device D1. The ICR_ex frame is also a SSP protocol message having a header similar to the CUR_ex frame. In accordance with the present invention, DLSw device D2 appends the SSP_RIF control vector 700 to the SSP header of the ICR_ex frame, whereby the novel control vector contains substantially the same contents as those of the CUR_ex frame, with the exception of the RIF. Here, the entire RIF contents of the TEST F frame are loaded into the RIF of the control vector.

When DLSw device D1 receives the ICR_ex frame, it checks to see if the SSP_RIF control vector 700 is appended to the SSP header of the frame. If the vector is present, DLSw device D1 retrieves the complete source route information from the SSP message and, rather than using the previously cached source route information as it would if the vector is not present, it uses the complete source route information to construct a TEST F frame for transmission to $ES_A$. DLSw device D1 then forwards the TEST F frame (including the complete source route information from the SSP message) over local TR1 for receipt by $ES_A$.

$ES_A$ then forwards an XID null poll (NULL P) frame with the complete end-to-end source route information over TR1. The XID NULL P frame is received by DLSw device D1 which determines whether the source route information ends on the DLSw virtual ring. Here, the contents of the XID NULL P frame are <0830.0011.FFF2.0020>and the source route information does not end of the DLSw virtual ring, since the RN/BN tuple pertaining to the virtual ring is "FFF2". Thus, DLSw device D1 recognizes this XID NULL P as a DLSw RIF passthru session frame. Accordingly, the DLSw device peers do not follow the logical flow defined by the conventional RFC 1795 DLSw session model (e.g., circuit start-up, circuit establishment, contact pending and connected state sequence); rather, in accordance with the invention, DLSw device D1 searches the RIF for the next hop (RN/BN) after the DLSw virtual ring.

Upon locating the next hop, DLSw device D1 indexes into its local database 450a that was created during the initial SSP capability exchange using the next hop information to determine which DLSw peer device should receive the frame. The next hop after the DLSw virtual ring is RN002/BN0, which denotes TR2 attached to destination end station $ES_B$. DLSw D1 thus indexes into its local database using this next hop information and determines that DLSw device D2 (BN2) should receive the XID NULL P frame.

Figure 8:
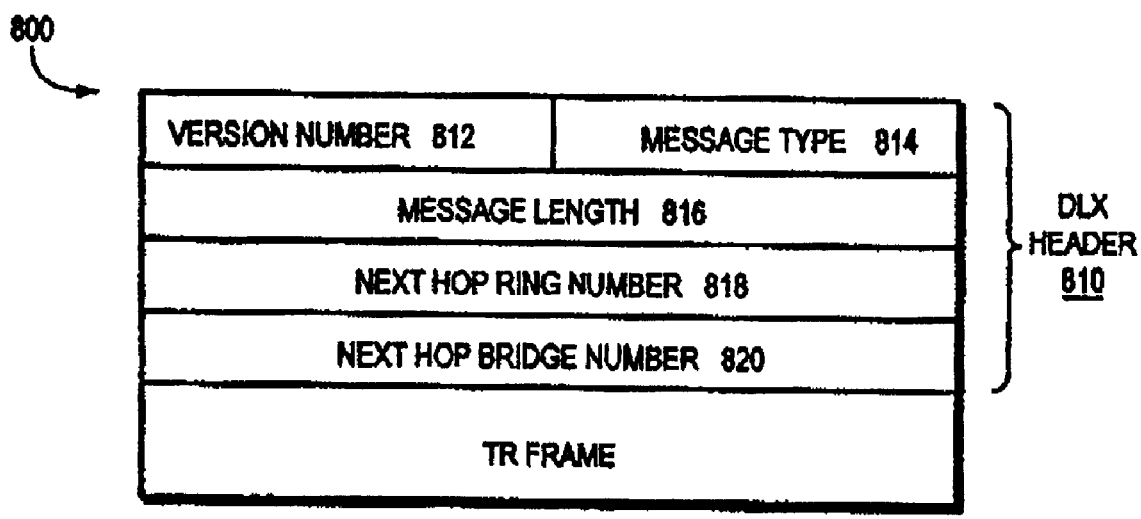
FIG. 8 is a schematic block diagram of the format of a novel DLX INFO frame used to forward frames over the DLSw network of FIG. 4 in accordance with the present invention.

In accordance with the invention, DLSw device D1 generates a novel RIF passthru frame, called a DLX INFO frame, for transmission over the TCP/IP cloud to DLSw device D2. FIG. 8 is a schematic block diagram of the format of the novel DLX INFO frame 800 used to forward frames over the TCP/IP cloud of the DLSw network once complete source route information is available to the end stations (users) on the local and remote SRB subnetworks. The DLX INFO frame 800 includes a DLX header 810 comprising a version number field 812 containing a version number of the message, a message type field 814 which identifies the DLX INFO frame, a message length field 816 whose contents reflect the entire length of the message including the DLX INFO header plus the length of the appended TR frame, a next hop ring number field 818 and a next hop bridge number field 820. The DLX header 810 is prepended to the incoming TR frame (XID NULL P frame) and forwarded over the TCP/IP cloud to DLSw device D2.

DLSw device D2 receives the DLX INFO frame 800 and checks the message format (i.e., the version number 812 of the DLX header 810) to determine whether it is a DLX or SSP message. If the message format is DLX, DLSw device D2 then checks the message type to determine whether it is DLX INFO frame 800. If it is, DLSw device D2 decapsulates the DLX header 810 from the XID NULL P frame and forwards that frame over a specific port based on the contents of the next hop ring number 818 and next hop bridge number 820 of the DLX header 810. Specifically, DLSw device D2 renders the forwarding decision by indexing into its local database 450b using the next hop ring number and bridge number information from the DLX header. In the present example, the next hop ring number is "002" and the next hop bridge number is "2", DLSw device is D2 sends the XID NULL P frame, including the entire source route information, over TR2 where it is received by $ES_B$.

In response to receiving the XID NULL P frame, $ES_B$ responds by sending an XID frame to DLSw device D2, which translates that frame into a DLX INFO frame 800 for transmission over the TCP/IP cloud 410. When DLSw device D1 receives the DLX INFO frame, it translates it into an XID frame for transmission to $ES_A$ in the same manner as described for the XID NULL P frame. Thereafter, XID frames may be exchanged between the two end stations followed by a SABME/UA exchange; according to the invention, each message exchange utilizes the DLX INFO frame 800 for transmission over the TCP/IP cloud 410. Finally, information frames (IFRAMEs) are exchanged between the end stations with the DLSw devices forwarding the IFRAMEs over the TCP/IP cloud as DLX INFO_FRAMEs.

Advantageously, the invention provides end-to-end transparent session establishment through a DLSw network as if the network is a single SRB network. That is, the DLSw devices merely forward TR frames based upon the source route information provided by the inventive DLSw RIF passthru technique, without maintaining any correlation information. The novel DLSw RIF passthru technique further allows DLSw switches to support different applications having different types of frames by transparently forwarding these frame over a DLSw network to a remote user based upon complete source route information. Thus an application such as LAN manager can show a complete network topology since its path finding frames may traverse the DLSw network end-to-end; moreover, an application such as remote NCP load can be advantageously used in accordance with the inventive technique. If loops are present in the network, redundant explorers can be dropped based upon RIF scanning since the RIF will reflect the entire path taken by the frame.

While there has been shown and described an illustrative embodiment for providing end-to-end source route information to source and destination end stations coupled to respective local and remote subnetworks of a DLSw network, it is to be understood that various other adaptations and modifications may be made within the spirit and scope of the invention. For example in an alternative embodiment of the present invention, NetBIOS protocol frames may be advantageously exchanged among the end stations in accordance with the novel DLSw RIF passthru technique. Here, name query explorer (NQ_ex) and name response explorer (NR_ex) SSP frames require source route information added to their payloads. As with the CUR_ex and ICR_ex frames described above, the NQ_ex and NR_ex SSP frames have similar SSP control header formats including reserve fields that can be used to carry the source routed information. In the case of a NetBIOS protocol session, however, no XID messages are exchanged after a name query/name response sequence has completed. Yet, as with the SNA flow described herein, it is the SABME message exchange that triggers the session setup.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modification as come within the true spirit and scope of the invention.

What is claimed is:

1. A method for providing end-to-end source route information to source and destination end stations coupled to respective local and remote source-route bridge (SRB) subnetworks of a data link switching (DLSw) network, the local and remote SRB subnetworks including respective local and remote DLSw peer devices that communicate over an intermediate wide area network (WAN), the method comprising the steps of:
    extracting the source route information from a routing information field (RIF) of a first token ring (TR) explorer frame at the local DLSw device;
    loading the source route information into a first control vector at the local DLSw device;
    transporting the first control vector over the WAN to the remote DLSw device;
    extracting the source route information from the first control vector at the remote DLSw device;
    loading the extracted source route information into a RIF of a second TR explorer frame; and
    transmitting the second TR explorer frame over the remote SRB subnetwork to the destination end station such that, upon receiving the second TR explorer frame, the destination end station has complete source route information representative of an end-to-end session with the source end station.

2. The method of claim 1 further comprising the steps of:
    generating the first TR explorer frame at the source end station; and
    accumulating source route information representative of a local SRB subnetwork path between the source end station and the local DLSw device within the RIF of the first TR explorer frame issued by the source end station and received by the local DLSw device.

3. The method of claim 2 further comprising the step of generating the first control vector at the local DLSw device.

4. The method of claim 3 wherein the step of transporting further comprises the steps of:
    appending the first control vector to a switch-to-switch protocol (SSP) header message and;
    transporting the SSP header message, including the appended first control vector, over the WAN to the remote DLSw device.

5. The method of claim 4 further comprising the step of generating the second TR explorer frame at the remote DLSw device.

6. The method of claim 5 further comprising the step of, at the remote DLSw device, appending next-hop information to the source route information contained within the RIF of the second TR explorer frame.

7. The method of claim 6 further comprising the steps of:
    transmitting a first response final frame containing the complete source route information from the destination end station to the remote DLSw device;
    extracting the complete source route information from the first response final frame at the remote DLSw device;
    loading the complete source route information into a second control vector at the remote DLSw device;
    transporting the second control vector over the WAN to the remote DLSw device;
    retrieving the complete source route information from the second control vector at the local DLSw device;
    loading the retrieved complete source route information into a second response final frame at the local DLSw device; and
    transmitting the second response final frame over the local SRB subnetwork to the source end station such that, upon receiving the second response final frame, the source end station has complete source route information representative of an end-to-end session with the destination end station.

8. Apparatus for providing end-to-end source route information to source and destination end stations coupled to respective local and remote source-route bridge (SRB) subnetworks of a data link switching (DLSw) network, the local and remote SRB subnetworks including respective local and remote DLSw peer devices that communicate over an intermediate wide area Newark (WAN), the apparatus comprising:
    means for extracting the source route information from a routing information field (RIF) of a first token ring (TR) explorer frame at the local DLSw device;
    means for loading the source route information into a first control vector at the local DLSw device;
    means for transporting the first control vector over the WAN to the remote DLSw device;
    means for extracting the source route information from the first control vector at the remote DLSw device;
    means for loading the extracted source route information into a RIF of a second TR explorer frame; and
    means for transmitting the second TR explorer frame over the remote SRB subnetwork to the destination end station such that, upon receiving the second TR explorer frame, the destination end station has complete source route information representative of an end-to-end session with the source end station.

9. Apparatus for providing end-to-end source route information to source and destination end stations coupled to respective local and remote source-route bridge (SRB) subnetworks of a data link switching (DLSw) network, the local and remote SRB subnetworks including respective local and remote DLSw peer devices that communicate over an intermediate wide area network (WAN) in accordance with DLSw routing information field (RIF) passthru functionality, the apparatus comprising:
    a memory for storing a plurality of capability message data structures exchanged among the DLSw peer devices to determine whether the peer devices support DLSw RIF passthru functionality, wherein a first of the plurality of message data structures comprises a DLSw RIF passthru exchange vector that indicates whether the DLSw peer devices support DLSw RIF passthru functionality;
    a processor coupled to the memory and configured to process the message data structures; and a network adapter coupled to the processor and memory for transmitting and receiving the message data structures to and from the WAN.

10. The apparatus of claim 9 wherein a second of the plurality of message data structures comprises a DLSw virtual ring vector that indicates a virtual ring used by the DLSw peer devices.

11. The apparatus of claim 10 wherein a third of the plurality of message data structures comprises a DLSw local rings vector that specifies a list of local rings attached to the DLSw peer devices.

12. The apparatus of claim 11 further comprising a local database table coupled to each DLSw peer device for storing information about the locally-attached rings specified by the DLSw local rings vector.

13. The apparatus of claim 12 further comprising a switch-to-switch protocol (SSP) control vector appended to a SSP header message structure stored in the memory, the SSP control vector containing source route information representative of one of the SRB subnetwork paths between one of the end stations and one of the DLSw peer devices.

14. The apparatus of claim 13 wherein the SSP control vector comprises a length field having contents that specify a length of the control vector and an identification field having contents that specify an SSP_RIF type of control vector.

15. The apparatus of claim 14 wherein the SSP control vector further comprises a source route information field containing the source route information.

16. The apparatus of claim 15 further comprising a DLX info frame structure stored in the memory, the DLX info frame configured to transport an appended frame over the WAN after the source route information is available to the end stations on the SRB subnetworks.

17. The apparatus of claim 16 wherein the DLX info frame comprises a header containing information required for an end-to-end RIF passthru session.

18. The apparatus of claim 17 wherein the header of the DLX info frame comprises a version number field containing a version number of the frame, a message type field having contents that identify the DLX info frame, and a message length field having contents that reflect an entire length of the frame including the header and appended frame.

19. The apparatus of claim 18 wherein the header of the DLX info frame further comprises a field containing a next hop ring number and a field containing a next hop bridge number.

20. A method for operating a router, comprising:
exchanging capabilities exchange messages with a remote router to inform said remote router that said router supports RIF passthrough capability;
receiving, in response to said remote router learning that said router supports RIF passthrough capability, a first control vector from said remote router, said first control vector having source route information from a routing information field (RIF) of a first token ring (TR) explorer frame transmitted by a source end station on a first TR network, said first control vector created at said remote router connected to said first TR network;
extracting said source route information from said first control vector;
loading said extracted source route information into a RIF of a second TR explorer frame; and
transmitting said second TR explorer frame on a second TR network to a destination end station to provide said destination end station with complete source route information representative of an end-to-end session with said source end station.

21. The method of claim 20 further comprising: said router and said remote router are DLSw devices.

22. A router, comprising:
means for exchanging capabilities exchange messages with a remote router to inform said remote router that said router supports RIF passthrough capability;
means for receiving, in response to said remote router learning that said router supports RIF passthrough capability, a first control vector from said remote router, said first control vector having source route information from a routing information field (RIF) of a first token ring (TR) explorer frame transmitted by a source end station on a first TR network, said first control vector created at said remote router connected to said first TR network;
means for extracting said source route information from said first control vector;
means for loading said extracted source route information into a RIF of a second TR explorer frame; and
means for transmitting said second TR explorer frame on a second TR network to a destination end station to provide said destination end station with complete source route information representative of an end-to-end session with said source end station.

23. A router, comprising:
a network adapter to exchange capabilities exchange messages with a remote router to inform said remote router that said router supports RIF passthrough capability and, in response to said remote router learning that said router supports RIF passthrough capability, said router to receive a first control vector, said first control vector having source route information from a routing information field (RIF) of a first token ring (TR) explorer frame transmitted by a source end station on a first TR network, said first control vector created at said remote router connected to said first TR network;
a processor to extract said source route information from said first control vector and to load said extracted source route information into a RIF of a second TR explorer frame; and
a network adapter to transmit said second TR explorer frame on a second TR network to a destination end station to provide said destination end station with complete source route information representative of an end-to-end session with said source end station.

24. The router of claim 23 further comprising: said router and said remote router are DLSw devices.

25. A computer readable media, said computer readable media containing instructions for execution in a processor for the practice of the method of providing end-to-end source route information to source and destination end stations coupled to respective local and remote source-route bridge (SRB) subnetworks of a data link switching (DLSw) network, the local and remote SRB subnetworks including respective local and remote DLSw peer devices that communicate over an intermediate wide area Newark (WAN), comprising:
extracting the source route information from a routing information field (RIF) of a first token ring (TR) explorer frame at the local DLSw device;
loading the source route information into a first control vector at the local DLSw device;

transporting the first control vector over the WAN to the remote DLSw device;

extracting the source route information from the first control vector at the remote DLSw device;

loading the extracted source route information into a RIF of a second TR explorer frame; and transmitting the second TR explorer frame over the remote SRB subnetwork to the destination end station such that, upon receiving the second TR explorer frame, the destination end station has complete source route information representative of an end-to-end session with the source end station.

26. Electromagnetic signals propagating on a computer network, said electromagnetic signals carrying instructions for execution on a processor for the practice of the method of providing end-to-end source route information to source and destination end stations coupled to respective local and remote source-route bridge (SRB) subnetworks of a data link switching (DLSw) network, the local and remote SRB subnetworks including respective local and remote DLSw peer devices that communicate over an intermediate wide area network (WAN), the method comprising the steps of:

extracting the source route information from a routing information field (RIF) of a first token ring (TR) explorer frame at the local DLSw device;

loading the source route information into a first control vector at the local DLSw device;

transporting the first control vector over the WAN to the remote DLSw device;

extracting the source route information from the first control vector at the remote DLSw device;

loading the extracted source route information into a RIF of a second TR explorer frame; and transmitting the second TR explorer frame-over the remote SRB subnetwork to the destination end station such that, upon receiving the second TR explorer frame, the destination end station has complete source route information representative of an end-to-end session with the source end station.

27. A computer readable media, said computer readable media containing instructions for execution in a processor for the practice of a method of operating a router, comprising:

exchanging capabilities exchange messages with a remote router to inform said remote router that said router supports RIF passthrough capability;

receiving, in response to said remote router learning that said router supports RIF passthrough capability, a first control vector from said remote router, said first control vector having source route information from a routing information field (RIF) of a first token ring (TR) explorer frame transmitted by a source end station on a first TR network, said first control vector created at said remote router connected to said first TR network;

extracting said source route information from said first control vector;

loading said extracted source route information into a RIF of a second TR explorer frame; and transmitting said second TR explorer frame on a second TR network to a destination end station to provide said destination end station with complete source route information representative of an end-to-end session with said source end station.

28. Electromagnetic signals propagating on a computer network, said electromagnetic signals carrying instructions for execution on a processor for the practice of a method of operating a router, comprising:

exchanging capabilities exchange messages with a remote router to inform said remote router that said router supports RIF passthrough capability;

receiving, in response to said remote router learning that said router supports RIF passthrough capability, a first control vector from said remote router, said first control vector having source route information from a routing information field (RIF) of a first token ring (TR) explorer frame transmitted by a source end station on a first TR network, said first control vector created at said remote router connected to said first TR network;

extracting said source route information from said first control vector;

loading said extracted source route information into a RIF of a second TR explorer frame; and transmitting said second TR explorer frame on a second TR network to a destination end station to provide said destination end station with complete source route information representative of an end-to-end session with said source end station.

* * * * *